T. J. KELLY.

BURNER FOR GAS-STOVE.

No. 6,833.

Reissued Jan. 4, 1876.

Witnesses.

W. B. Masson.

Edmund Masson

Inventor.

Thomas J. Kelly.

By atty A. B. Stoughton.

UNITED STATES PATENT OFFICE.

THOMAS J. KELLY, OF NEW YORK, N. Y., ASSIGNOR, BY MESNE ASSIGNMENTS, TO JAMES L. SHARP, OF SAME PLACE.

IMPROVEMENT IN BURNERS FOR GAS-STOVES.

Specification forming part of Letters Patent No. 50,938, dated November 14, 1865; reissue No. 6,833, dated January 4, 1876; application filed August 18, 1875.

*To all whom it may concern:*

Be it known that I, THOMAS J. KELLY, of the city, county, and State of New York, have invented a new and Improved Burner for Gas-Stoves; and I do hereby declare that the following is a full and exact description thereof, reference being had to the accompanying drawings, and to the letters of reference marked thereon.

Similar letters of reference indicate the same devices in all the figures.

To enable others skilled in the arts to comprehend, make, and use my invention, I will proceed to describe its nature, construction, and operation, in connection with the accompanying drawings, in which—

Figure 1:
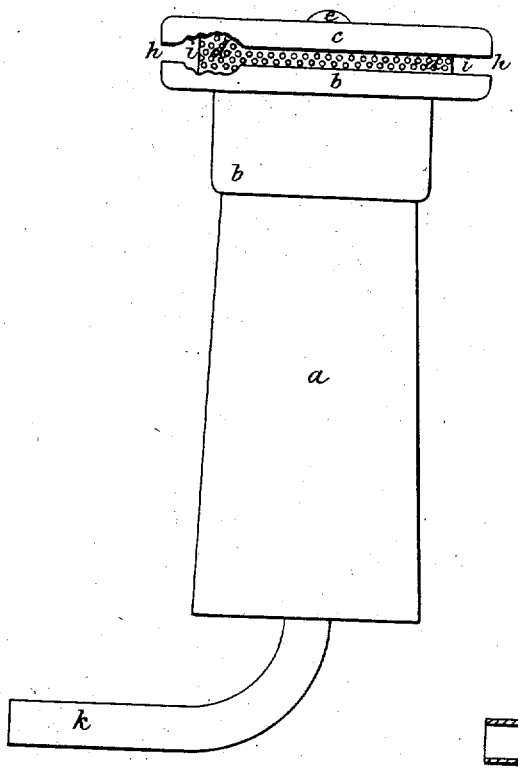
Figure 2:
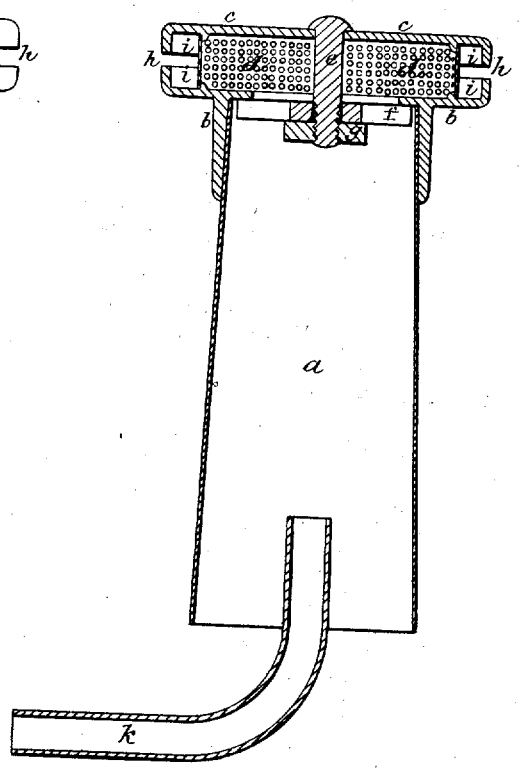

Figure 1 represents an elevation of my improved burner, showing a portion of the head broken away to expose the diaphragm. Fig. 2 represents a vertical section of the same, showing its interior construction.

My invention consists, first, in the combination of an outlet or opening, through which the inflammable material passes, so as to be ignited into a horizontal sheet of flame, a perforated diaphragm, through which the gas and air passes and becomes thoroughly mixed, and a chamber intermediate between the diaphragm and the outlet. It further consists in the combination of the vertically-arranged diaphragm with the external annular opening, so as to burn the inflammable material against the head of the burner instead of against the diaphragm.

*a* represents the body of the burner, and *b* and *c* the head thereof, formed in two pieces, holding the vertical diaphragm *d* between them, and bolted together by the bolt and nut *e* and *g*. A bar, *f*, rests upon the lower half of the head, through which the bolt *e* passes, to hold the two halves of the head together. *h* is an external annular opening passing around the head of the burner, and *i* is a chamber between the diaphragm and external opening, and *k* is the supply-pipe.

My invention relates to that kind of burner used in gas-stoves; and its object is to gather the mixed gas and air into a chamber after it has passed the diaphragm, and then, by a suitable external opening, produce an unbroken sheet of flame, by which means I obtain a much greater heat from the same quantity of gas than by burning the gas directly upon the diaphragm.

The operation of my improved burner is as follows: As the gas passes into the body of the burner, and is ignited above the diaphragm, the heat produces a draft of air into the bottom of the burner, which is left open for that purpose, and as the gas and air rise and pass through the diaphragm together, they become perfectly mixed, and, by means of chamber *i* and external opening *h*, they are formed into an unbroken sheet, which, when ignited, gives off more heat than the same amount of gas would otherwise produce.

By the employment of a vertical diaphragm with the annular opening, I obtain a very small chamber, bringing the diaphragm very near the external opening, and at the same time I obtain a horizontal flame.

It has been found by experiment that an unbroken flame thrown out horizontally entirely around the top of the burner gives off more heat, when applied to the heating of vessels, than several small flames, and it has also been found that by the employment of a vertical diaphragm, and placing it so near the external opening that there will be only a small chamber between the diaphragm and said opening, the explosion of the gas in said chamber does not ignite the gas below the diaphragm, as it almost invariably does when a horizontal diaphragm is employed.

These burners may be made of any suitable material, and in any desired form.

What I claim, and desire to secure by Letters Patent, is—

1. The combination of the outlet or opening, through which the inflammable material passes, so as to be ignited into a horizontal sheet of flame, the perforated diaphragm, through which the gas and air pass and become thoroughly mixed, and the chamber intermediate between the diaphragm and the outlet, substantially as described.

2. The combination of the vertically-arranged diaphragm with the external annular opening, to burn the inflammable material against the head of the burner, substantially as described.

THOS. J. KELLY.

Witnesses:
HALLECK BARTLETT,
GEORGE OWEN.